Patented Aug. 29, 1944

2,357,260

UNITED STATES PATENT OFFICE 2,357,260

INSECTICIDE

Percy E. Joyce, Calcutta, India, assignor to Shell Development Company, San Francisco, Calif., a corporation of Delaware No Drawing. Application September 12, 1940, Serial No. 356,495

14 Claims. (Cl. 167—22)

This invention deals with a new insecticidal composition of great utility and is particularly concerned with toxic substances suitable for use in household fly sprays.

Among the best known and most useful insecticides at present are pyrethrum and rotenone. These are both derived from plants grown in foreign countries and are therefore expensive and not always obtainable in the desired quantities. Pyrethrum causes paralysis quickly, followed by death or recovery in a few hours. Rotenone is very effective as a killing agent but is slow acting so that it is only suitable for use where slowly dying insects are not objectionable.

It is an object of the present invention to provide an insecticide which can be manufactured from readily available, inexpensive, domestic materials. It is a further object of this invention to provide an insecticide which is fast acting and which is very toxic. Another object is to provide an insecticide which is substantially non-toxic to man and other warm blooded animals. Other objects will be apparent on reading the specification.

It has now been found that the higher unsaturated ketones, i. e. those having at least 12 carbon atoms are effective insecticides. Unsaturated ketones having more than 12 carbon atoms are preferred, those having about 18 carbon atoms being more effective as insecticides than those with 12. The higher molecular weight unsaturated ketones are darker and more viscous than the lower members, those having more than 24 carbon atoms being of a dark, resinous nature. Therefore, the lower ketones, say from $C_{12}$ to $C_{18}$ are preferred where staining is of importance, such as in household insecticides. The dark viscous ketones are, however, very useful in cattle and plant sprays where color is not important.

Pure ketones such as straight, branched, cyclic or alicyclic ketones may be used for the purposes of this invention, but the preferred ketones are mixtures, both in terms of configuration and molecular weight, obtained by the condensation of lower molecular weight ketones. Such mixtures of higher unsaturated ketones may be produced by the aldol condensation (followed by dehydration) of lower molecular weight ketones such as acetone, methyl ethyl ketone, methyl propyl ketone and mesityl oxide. These are named merely as typical ketonic starting materials which are cheap and readily available, but other ketones such as aliphatic saturated ketones, e. g. diethyl ketone, methyl isopropyl ketone, methyl or ethyl normal-, secondary-, or tertiary- or isobutyl ketones, dipropyl or propyl-isopropyl ketones, amyl and hexyl ketones and their isomers; aliphatic unsaturated ketones e. g. methyl allyl ketones, methyl isopropenyl ketones, methyl vinyl ketones, hexene-1-1-5, and isomeric ketones and higher homologues thereof; cyclic ketones such as cyclopentanone, cyclohexanone or methyl cyclo hexanone; and alicyclic ketones such as methyl cyclohexyl ketone and the like or mixtures of any two or more of them may be used. If desired, the ketones may also contain substituents which increase the toxicity towards insects, are inert to the condensation reaction and do not render the products toxic to man, such as sulfur, and, in some instances, halogen atoms. Other suitable ketones include polyketones and ketones obtained by dehydrogenation of secondary alcohols. The ketones subjected to condensation may be used as pure compounds or impure mixtures of varying molecular weight and composition, such as mixtures of ketones with saturated aldehydes, e. g. formaldehyde or propionaldehyde, or with unsaturated aldehydes as acrolein and methacrolein. The reaction of ketones with aldehydes will normally result in the formation of unsaturated ketones, and it is understood that aldehydes are here included in the group of carbonyl compounds suitable for condensation. The starting material may be a ketone such as mesityl oxide, phorone or isophorone, which has been produced by condensing lower molecular weight ketones.

The ketone mixtures so produced are substantially free from carboxyl or ester groups, which are undesirable in that they render compounds extremely high boiling, and thus lower their effectiveness. For this reason, it is often desirable that the ketones have but a single polar radical namely the one carbonyl radical.

The unsaturated ketones may be obtained by the liquid or vapor phase condensation of the starting materials given above by the use of condensation catalysts such as aqueous solutions of strong acids, e. g. sulfuric and phosphoric acids, strong bases e. g. sodium or potassium hydroxide or salts as aluminum chloride, boron fluoride, acetic anhydride, the zinc alkyls, sodium pyrosulfate, activated alumina and the like. One particularly good catalyst was made by mixing an insoluble hydroxide such as calcium hydroxide with a basic material such as sodium silicate, borax or Portland cement which catalyst can be used in the powdered form.

The reaction can be carried out at atmospheric, reduced or superatmospheric pressure and preferably at about 50 to 150° C. The reaction ordinarily takes from 1 to 4 hours, depending on the activity of the catalyst and reactants, temperature, and degree of condensation desired. The product produced ordinarily consists of a mixture of unsaturated ketones and/or ketols. Unsaturated ketones with strong condensation catalysts at elevated temperatures tend to yield ketones as the principal product, while saturated ketones with the less active catalysts tend to produce ketols. If ketols are produced by the particular reactants, catalyst and conditions selected they can be dehydrated to ketones by heating them with dehydration catalysts, e. g. sodium acid tartrate and/or iodine.

The ketones produced by direct condensation or aldol condensation followed by dehydration may be separated into fairly narrow fractions by distillation such as ordinary distillation, vacuum distillation, extractive distillation or azeotropical distillation. For many purposes, the crude mixtures of ketones produced by condensation are suitable for direct use as insecticides, but for other applications such as household insecticides, fairly narrow fractions of the ketones are most desirable. One of the best fractions for use as a fly spray contains predominantly $C_{18}$ ketones. This fraction was found to produce very little staining and to be very toxic to flies.

The ketones produced by condensation are of unknown configuration, but probably consist primarily of branched chain and cyclic ketones. Knoevenagel and Schwartz in Berichte 39, 3448 postulate the following formula for the $C_{12}$ unsaturated ketone prepared by the condensation of mesityl oxide:

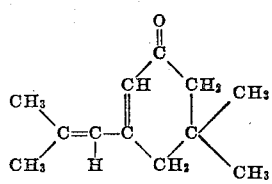

and it is likely that the still higher ketones produced by the condensation reaction have similar formulae.

This is given for information only and not to limit the scope of this invention.

The unsaturated ketones possess an advantage over the corresponding saturated ketones of the same number of carbon atoms in that they are more toxic.

To show the effectiveness of the ketones of the present invention, Peet Grady tests were made. This test is fully described in the 1940 "Blue Book" published by the publisher of "Soap and Sanitary Chemicals" periodical on pages 193 to 197, as the large group method. Briefly the test consists of releasing 500 flies in an air-conditioned cage 6 x 6 x 6 feet and spraying them with 12 ml. of insecticide. After 10 minutes exposure the number of flies which are incapacitated or "knocked down" is noted and all flies are transferred to a cage and allowed to recuperate in fresh air for 24 hours, when the dead flies are counted. For the purposes of this study the official Peet Grady procedure was not followed in calculating the results, but only the percentages knocked down at 10 minutes and killed at 24 hours were recorded. For purposes of comparison a spray was included in the tests made from 95% odorless base (an odor-free refined kerosene) and 5% of pyrethrum extract (20:1 concentrate). Tests were also included on mixtures of the ketones with pyrethrum. The following results were obtained:

| Insecticide | 10 minute knockdown | 24 hour kill |
|---|---|---|
| Pyrethrum (20:1), 5%<br>Odorless base, 95% | 94 | 31 |
| $C_{12}$ unsaturated ketone (100%) | 96 | 44 |
| $C_{12}$ unsaturated ketone, 50%<br>Odorless base, 50% | 97 | 54 |
| $C_{12}$ unsaturated ketone, 25%<br>Odorless base, 75% | 90 | 8 |
| $C_{18}$ unsaturated ketone, 50%<br>Odorless base, 50% | 92 | 85 |
| $C_{18}$ unsaturated ketone, 25%<br>Odorless base, 75% | 90 | 81 |

Besides being useful as an insecticide, the unsaturated ketones are valuable in increasing the insecticidal powers of other known insecticides. Thus they may be used in combination with plant products such as pyrethrum to produce insecticides which are more effective than would be predicted from the insecticidal action of either the ketones or pyrethrum. The ketones may be used in combination with other well-known insecticides or fungicides such as lead arsenate, rotenone, nicotine, thiocyanates, isothiocyanates, copper naphthenate or the like. The unsaturated ketones may be used to particular advantage in combination with mineral oils and rotenone. Rotenone is not soluble in mineral oils and is difficult to disperse or suspend. The addition of the unsaturated ketones however aids in suspending the rotenone in oil.

The unsaturated ketones may be applied to plants and animals in a variety of ways. For use as household insecticides the ketones may be dissolved in a light hydrocarbon oil such as kerosene distillate with or without the addition of other insecticides and sprayed. Ordinarily from about 1 to 25% of the unsaturated ketones are used in such sprays. For use on plants, the ketones may be dissolved in plant spray oils and emulsified in water to produce sprayable emulsions. The common emulsifying agents such as glycerol mono-oleate, amine salts, sulfated and sulfonated fatty and mineral oils, soaps and the like may be used in combination with such sprays. In the same manner, the ketones themselves, without the addition of oil may be emulsified and used as plant spray insecticides. The ketones may also be adsorbed by finely divided solid materials such as wood flour, talc, clay, sulfur, or carbon black and used as dusting insecticides. For this purpose the heavier resin-like ketones are preferred.

I claim as my invention:

1. An insecticide comprising a carrier and an unsaturated ketone having at least 12 carbon atoms selected from the group consisting of aliphatic ketones and cyclo ketones having the keto group in the ring, said ketones being further characterized by being produced by condensing unsubstituted carbonyl compounds with themselves.

2. An insecticide comprising a carrier and a mixture of unsaturated ketones selected from the group consisting of aliphatic ketones and cyclo ketones having the keto group in the ring and having at least 12 carbon atoms said ketones being further characterized by being produced by condensing unsubstituted carbonyl compounds with each other.

3. An insecticide comprising a carrier and a mixture of unsaturated, normally liquid, ketones having at least 12 carbon atoms produced by condensing lower molecular weight dialkyl ketones with each other.

4. An insecticide comprising a carrier and an unsaturated ketone having at least 12 carbon atoms and being free of carboxy groups selected from the group consisting of aliphatic ketones and cyclo ketones having the keto group in the ring.

5. An insecticide comprising a carrier and an unsaturated ketone having at least 12 carbon atoms selected from the group consisting of aliphatic ketones and cyclo-ketones having the keto group in the ring and in which all of the oxygen in the ketones is present as carbonyl oxygen.

6. An insecticide comprising a carrier and an unsaturated ketone having at least 12 carbon atoms selected from the group consisting of aliphatic ketones and cyclo ketones having the keto group in the ring and in which the toxic radicals consist of carbonyl radicals.

7. An insecticide comprising a carrier and an unsaturated mono ketone having at least 12 carbon atoms selected from the group consisting of aliphatic ketones and cyclo ketones having the keto group in the ring and in which the carbonyl group is the sole polar radical.

8. A household insecticide comprising a light hydrocarbon oil and an unsaturated ketone having from 12 to 18 carbon atoms selected from the group consisting of aliphatic ketones and cyclo ketones having the keto group in the ring and being a product obtained by condensing lower molecular weight unsubstituted ketones with each other.

9. A household insecticide comprising a light hydrocarbon oil and an unsaturated ketone having 18 carbon atoms selected from the group consisting of aliphatic ketones and cyclo ketones having the keto group in the ring and being a product obtained by condensing lower molecular weight unsubstituted ketones with each other.

10. A plant spray insecticide comprising a plant spray mineral oil, an emulsifying agent and an unsaturated ketone, said ketone having at least 12 carbon atoms selected from the group consisting of aliphatic ketones and cyclo ketones having the keto group in the ring and being a product obtained by condensing lower molecular weight unsubstituted ketones with themselves.

11. An insecticide comprising a carrier and a ketone having at least 12 carbon atoms, free from carboxy groups and characterized by having at least one cyclohexenone ring.

12. As a dust insecticide a composition comprising a finely divided adsorptive substance and an unsaturated ketone said ketone having at least 12 carbon atoms selected from the group consisting of aliphatic ketones and cyclo ketones having the keto group in the ring and being a product obtained by condensing lower molecular weight unsubstituted ketones with themselves.

13. The composition of claim 11 in which the ketones are of a resinous nature.

14. The process of controlling insects, comprising the step of exposing them to an unsaturated ketone having at least 12 carbon atoms selected from the group consisting of aliphatic ketones and cyclo ketones having the ketone group in the ring, said ketones being further characterized by being produced by condensing unsubstituted carbonyl compounds with themselves.

PERCY E. JOYCE.